J. H. WEATHERFORD.
TOY.
APPLICATION FILED MAR. 20, 1913.

1,120,871.

Patented Dec. 15, 1914.

2 SHEETS—SHEET 1.

Witnesses

Inventor
Joseph H. Weatherford

J. H. WEATHERFORD.
TOY.
APPLICATION FILED MAR. 20, 1913.

1,120,871.

Patented Dec. 15, 1914.
2 SHEETS—SHEET 2.

Witnesses
Inventor
Joseph H. Weatherford

UNITED STATES PATENT OFFICE.

JOSEPH H. WEATHERFORD, OF MEMPHIS, TENNESSEE.

TOY.

1,120,871.  Specification of Letters Patent.  Patented Dec. 15, 1914.

Application filed March 20, 1913. Serial No. 755,623.

*To all whom it may concern:*

Be it known that I, JOSEPH H. WEATHERFORD, a citizen of the United States, residing in Memphis, in the county of Shelby and State of Tennessee, have invented certain new and useful Improvements in Toys, of which the following is a specification.

My invention relates to certain new and useful improvements in toys, of which the following is a full, clear and exact description, such as will enable any one skilled in the art to make and use the same.

The object of my invention is to provide a self-contained toy, which will operate by the force of gravity and which will operate in a similar manner when reversed, thus making the operation practically continuous. I accomplish this object by providing a reversible frame carrying a movable part or tumbler which descends by gravity to the bottom and which when reversed again descends and so on *ad infinitum*.

Figure 1:
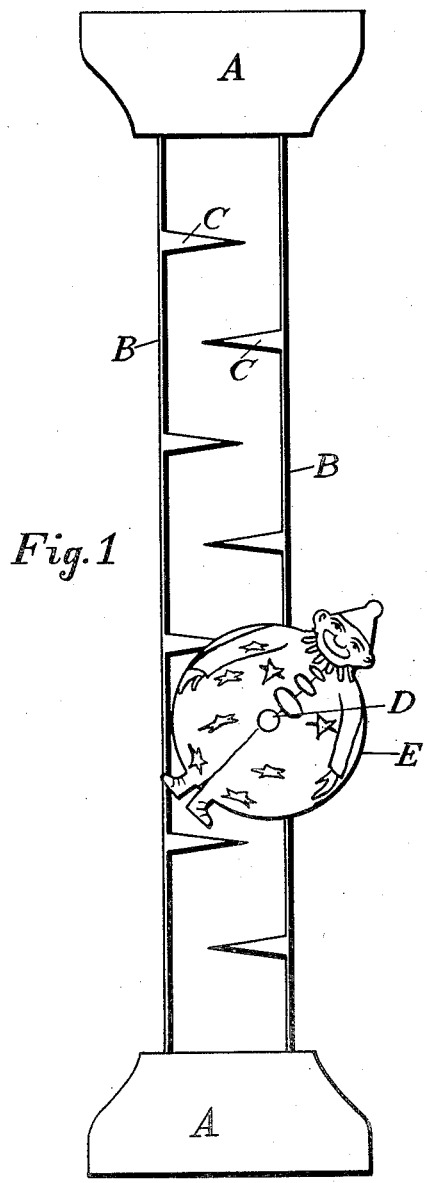
Figure 2:
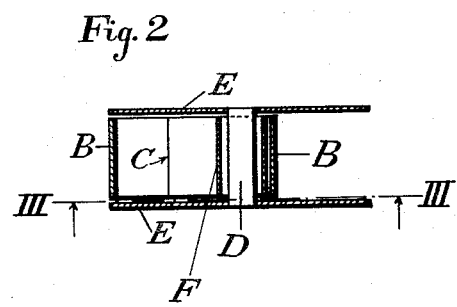
Figure 3:
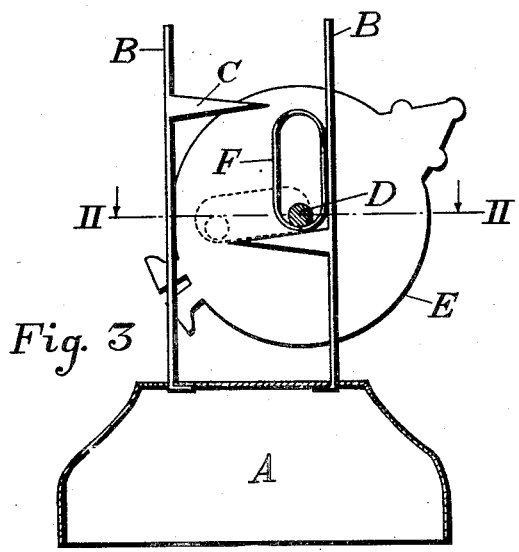
Figure 4:
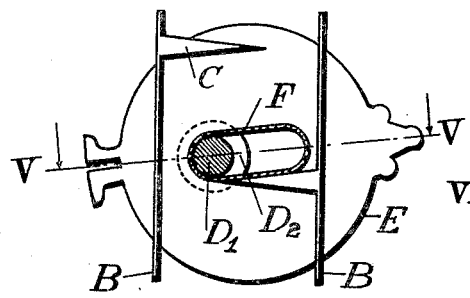
Figure 6:
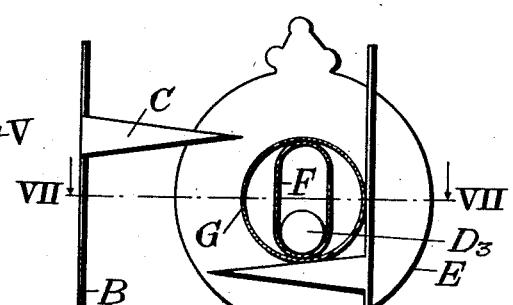
Figure 5:
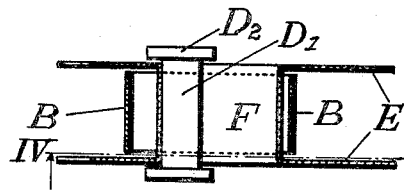
Figure 7:
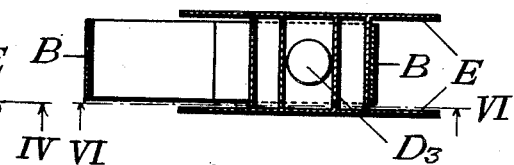
Figure 8:
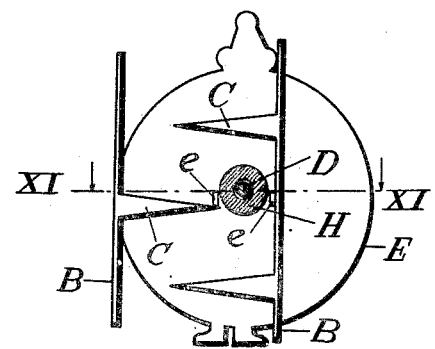
Figure 9:
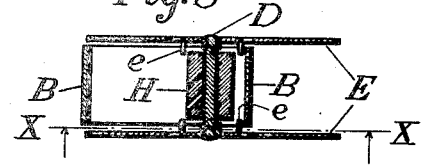

In the drawings: Figure 1 is a side elevation of my toy. Fig. 2 is a sectional plan on an enlarged scale taken on the line II—II of Fig. 3. Fig. 3 is a front elevation on an enlarged scale with the front figure or manikin removed to show operation. Figs. 4 and 5 are respectively a similar front elevation, and a sectional plan taken on the line V—V showing a modification. Figs. 6 and 7 are respectively a similar front elevation, and a sectional plan on the line VII—VII showing a second modification. Figs. 8 and 9 are respectively a similar front elevation, and a sectional plan on the line XI—XI showing a third modification. Figs. 10 and 11 are respectively a similar front elevation and a sectional plan taken on the line XI—XI showing a fourth modification.

Referring now to the drawing in which like parts are designated by letters of reference in the different views, the toy consists primarily of a reversible frame having similar bases A, A, top and bottom, the top when reversed becoming the base. These two bases are connected by parallel side frames B. From these side frames project shelves C spaced equal distances apart, the shelves on one side alternating with those on the opposite side, and in both cases projecting outward from the side frames only a part of the distance toward the opposite frame. These shelves are preferably made wedge shape, as shown, so as to present top and bottom faces inclined at equal angles to the supporting frame, so that with either base at the bottom the shelf angles and relative locations are the same. On these shelves is disposed a tumbler which by the action of gravity takes its way down the shelves to the bottom, which being then reversed becomes the top, the tumbler then working its way to the bottom again. This tumbler, as shown in Figs. 8 and 9, comprises primarily a shaft D which is placed between the side frames B and rests on one of the shelves C, and which projects sufficiently beyond the sides of the frames and shelves to carry on each end some ornamental figure E preferably in the shape of an acrobat or clown. A portion of this figure is preferably made as shown in the form of a disk or circular washer of such diameter as to prevent the removal of the shaft and figures from the frame. This tumbler so constructed rolls to the end of the top shelf C then drops to the shelf below and here the rotation acquired by the rolling holds it against the side frame A until the force of gravity starts it rolling in a reverse direction down that shelf. Should the speed acquired be too great it may be necessary to check same by some other means. This can be done as shown in Figs. 2 and 3 by using a loop F of light metal or celluloid comprising parallel sides connected by semicircular ends. If this construction is used the shaft D rolls rapidly down the side of the loop and is checked by the semicircular ends which it slowly rolls upon thereby turning the whole loop over and allowing it as constructed ordinarily in this toy to drop vertically onto the shelf below.

A modified form of this invention, shown in Figs. 4 and 5, consists of the side frames B and shelves C constructed as above described but having the tumbler E made a part of the loop F and having an operating shaft $D_1$ with retaining flanges $D_2$ which rolls down the loop F and causes the figure to move. In this case the shaft $D_1$ is of heavy metal, while the loop F and the figure E shall be of light metal or celluloid. This idea is further shown in Figs. 6 and 7 in which the loop F is inclosed by a circular roller G, the motion being interrupted and made intermittent by a ball $D_3$ in lieu of the roller $D_1$ just described.

Another modification is shown in Figs. 10 and 11 in which the shaft D is attached to the figures E slightly above the center of gravity and turns freely in a roller H which rolls down the inclined shelves C. Lugs e, e project inward from the figures E E on the same level as the shaft D or slightly below same and are so disposed that when the tumbler reaches the end of the shelf C and drops, the lugs e e next the shelf catch on same and cause the figure E to turn a somersault, the slight extra weight in the feet of the figures then causing the figures to again regain and hold their upright position.

Having now fully described my device, what I claim and desire to secure by Letters Patent in the United States is:

1. The combination with parallel side frames, suitable connecting bases and wedge shaped shelves extending outward alternately from the opposite frames, of a shaft projecting through between said frames and disposed on said shelves, suitable figures on the end of said shaft adapted to retain same in said frame and means of checking the speed of said shaft, substantially as shown and described.

2. The combination with parallel side frames, suitable connecting bases and wedge shaped shelves extending outward alternately from the opposite frames, of a roller disposed on said shelves, a shaft projecting through said roller, suitable figures on the ends of said shaft adapted to retain same in said frame, and lugs projecting inward from said figures, substantially as and for the purposes set forth.

3. The combination with parallel side frames, suitable connecting bases and wedge shaped shelves extending outward alternately from the opposite frames, of a roller disposed on said shelves, a shaft projecting through said roller, suitable figures on the ends of said shaft adapted to retain same in said frame, and means of tripping said figures, substantially as shown and described.

4. The combination with parallel side frames, suitable connecting bases and wedge shaped shelves extending outward alternately from the opposite frames, of a tumbler comprising a roller disposed on said shelves, a shaft projecting through said roller, suitable figures on the end of said shaft adapted to retain same in said frame, said shaft being above the center of gravity of said figures, and means of tripping said figures when said tumbler drops from one shelf to the next, substantially as shown and described.

5. The combination with parallel side frames, suitable connecting bases and wedge shaped shelves extending outward alternately from the opposite frames, of a tumbler comprising a roller disposed on said shelves, a shaft projecting through said roller, suitable figures on the end of said shaft adapted to retain same in said frame, said shaft being above the center of gravity of said figures, and lugs projecting from said figures, substantially as and for the purposes set forth.

6. The combination with a reversible frame having zigzag runways, of a roller disposed in said runways, a shaft projecting through said roller, suitable figures on the ends of said shaft adapted to retain same in said frame, and means of checking the speed of said shaft, substantially as shown and described.

7. The combination with a reversible frame having zigzag runways, of a shaft disposed in said runways, suitable figures on the end of said shaft adapted to retain same in said frame, and means of checking the speed of said shaft, substantially as shown and described.

8. The combination with a reversible frame having zigzag runways, of a tumbler comprising a roller disposed in said runways, a shaft projecting through said roller, suitable figures on the end of said shaft adapted to retain same in said frame and means of checking the speed of said shaft, substantially as shown and described.

9. The combination with a reversible frame having zigzag runways, of a roller disposed in said runways, a shaft projecting through said roller, suitable figures on the end of said shaft adapted to retain same in said frame, and means of tripping said figures, substantially as shown and described.

10. The combination with a reversible frame having zigzag runways, of a roller disposed in said runways, a shaft projecting through said roller, suitable figures on the end of said shaft adapted to retain same in said frame, said shaft being above the center of gravity of said figures, and means of tripping said figures when said tumbler drops from one section of the runway to the next, substantially as shown and described.

11. The combination with a reversible frame having zigzag runways, of a roller disposed in said runways, a shaft projecting through said roller, suitable figures on the end of said shaft adapted to retain same in said frame, said shaft being above the center of gravity of said figures, and lugs projecting inward from said figures, substantially as for the purposes set forth.

In testimony whereof I have hereunto subscribed my name.

JOSEPH H. WEATHERFORD.

Witnesses:
 HORACE H. HULL,
 W. W. JONES.